United States Patent [19]

Wagner

[11] 4,364,753
[45] Dec. 21, 1982

[54] APPARATUS FOR THE ADSORPTIVE CLEANING OF GASES

[75] Inventor: Norbert Wagner, Schlederloh, Fed. Rep. of Germany

[73] Assignee: Linde AG, Wiesbaden, Fed. Rep. of Germany

[21] Appl. No.: 951,876

[22] Filed: Oct. 16, 1978

[30] Foreign Application Priority Data

Oct. 18, 1977 [DE] Fed. Rep. of Germany ..... 27466735

[51] Int. Cl.³ ............................................. B01D 53/04
[52] U.S. Cl. ...................................... 55/179; 55/387; 55/475
[58] Field of Search .................. 55/59, 179, 180, 181, 55/196, 198, 267, 387, 389, 475; 210/264, 282, 289, 456; 422/242

[56] References Cited

U.S. PATENT DOCUMENTS

| 1,840,031 | 1/1932 | Green | 210/289 X |
| 1,931,989 | 10/1933 | Jenness | 55/267 X |
| 2,083,732 | 6/1937 | Moore et al. | 55/196 |
| 2,768,200 | 10/1956 | Busby | 422/242 X |
| 2,772,747 | 12/1956 | Browning et al. | 55/198 |
| 2,790,505 | 4/1957 | Dow | 55/179 X |
| 2,995,208 | 8/1961 | Hachmuth et al. | 55/180 X |
| 3,038,790 | 6/1962 | Beggs et al. | 55/387 X |
| 3,123,453 | 3/1964 | Loomer et al. | 55/179 X |
| 3,254,476 | 6/1966 | Kusek et al. | 55/267 |
| 3,339,737 | 9/1967 | Kiscellus et al. | 210/289 X |
| 3,731,460 | 5/1973 | Narumi | 55/179 |

FOREIGN PATENT DOCUMENTS 1153086 5/1969 United Kingdom .

*Primary Examiner*—Robert H. Spitzer
*Attorney, Agent, or Firm*—Karl F. Ross

[57] ABSTRACT

An apparatus for the adsorptive cleaning of gases comprises a rigid hermetically sealed housing provided internally with an inner vessel connected with the outer housing by a fluid carrying duct which is yieldable along the axis of the inner housing. The inner housing rests upon a grate and can be surrounded by a layer of thermal insulation. A filling of the adsorbent is provided in the inner vessel which is free from the usual bottoms carrying beds of adsorbent.

4 Claims, 4 Drawing Figures

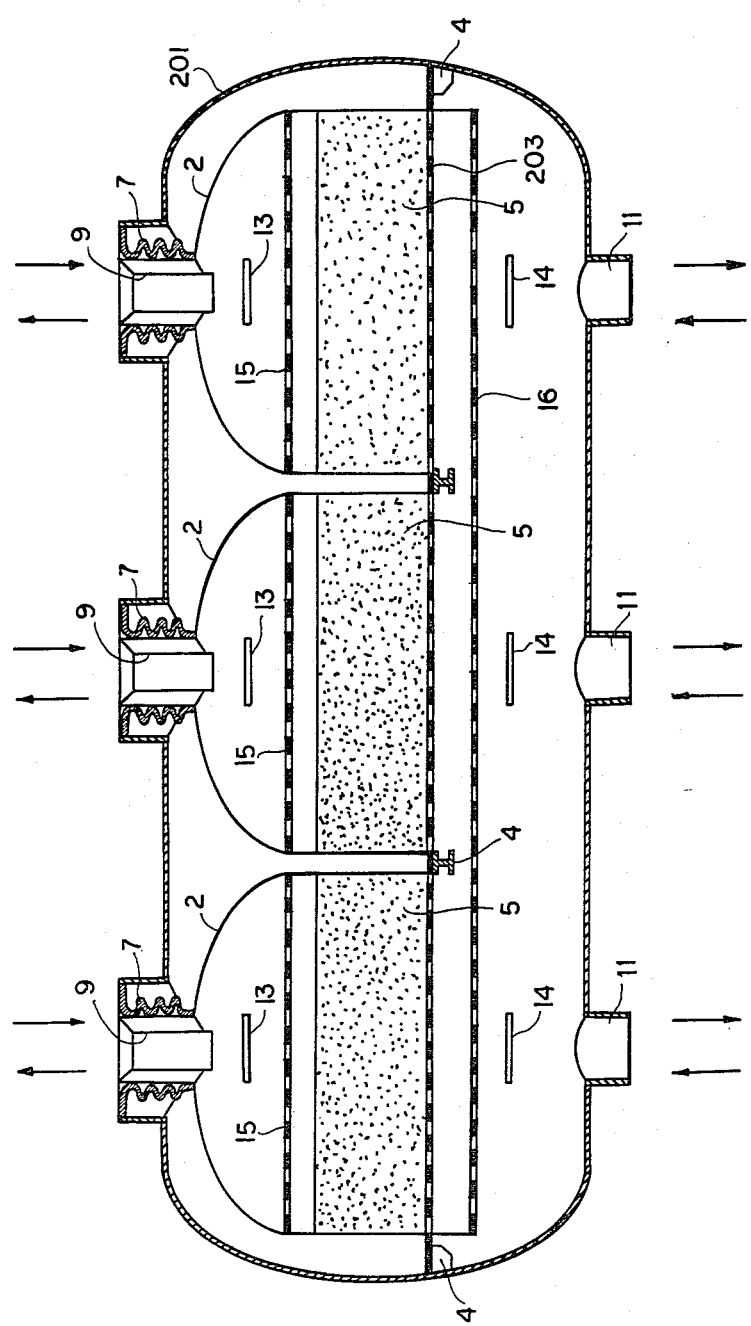

APPARATUS FOR THE ADSORPTIVE CLEANING OF GASES

FIELD OF THE INVENTION

My present invention relates to an apparatus for the adsorptive cleaning of gas and, more particularly, to a system in which gas is passed in one direction through a body of adsorptive material, generally in a loosely piled state, while a regenerating agent, e.g. hot gas, is passed in the opposite direction through this body to regenerate the adsorption agent.

BACKGROUND OF THE INVENTION

An apparatus for the adsorptive cleaning of a gas in general comprises a housing or vessel formed with a support for a body of gas-permeable adsorption agent, e.g. active carbon in a loosely piled state, and with inlet and outlet fittings (ducts) for enabling the gas to be cleaned to be passed through this body of adsorbent in one direction and a regenerating agent, e.g. another gas, to be passed through this body in the opposite direction.

In U.S. Pat. No. 2,083,732, for example, the apparatus for the adsorptive cleaning of gases comprises a pressure-sustaining rigid outer vessel and a thin-wall inner vessel containing the solid adsorption agent. The adsorber is provided with inlet and outlet ducts for gases and is also formed with a heating device which is capable of generating the heat necessary for regenerating of the adsorbent. Between the thin-wall inner vessel and the pressure-sustaining (thick-wall) outer vessel there can be provided layers of insulating material.

The thermal efficiency of such an arrangement is relatively good since it enables the applied heat to be limited only to the body of adsorbent and the thin-wall inner vessel, in producing the high temperature for the regeneration process.

The entire adsorber, with its massive outer vessel and hence high heat capacity, thus need not be heated to the regenerating temperature.

The system has, however, the disadvantage that the rigid connection of the inner vessel at its upper and lower ends, when it is upright or vertically elongated unduly strains the weld joints between the inner and outer vessels and, with repeated stressing and distressing of these joints in the cycling of the adsorber, brings about failure of such connections.

Apart from this, the inner vessel of the conventional system cannot effectively withstand the pressure fluctuations to which it is normally subjected during recycling. For example, the inner vessel is usually subjected to the full pressure of the gas during the process and, because of its thin-wall construction, must be externally supported by the insulating layers.

When this insulation consists of loosely wound turns or a loose-packed particulate material, deformation of the inner vessel is unavoidable.

This problem is also recognized in part in U.S. Pat. No. 2,083,732 and to prevent such distortion of the inner vessel, it is there proposed to provide a gas inlet and outlet duct between the inner and outer vessels with a small opening so that pressure equilibrium can be effected between the pressure within the inner vessel and that in the insulation surrounding it, thereby reducing the net force upon the inner vessel when the latter is operated with pressurized gas.

In recent years, this solution has been found to be ineffective because modern adsorption and regenerating processes operate with rapid build-up and decrease in pressure. As a consequence, these systems have proved to be unsatisfactory and have been avoided of late.

OBJECTS OF THE INVENTION

It is the principal object of the present invention to provide an improved regeneration adsorber which retains the high thermal efficiency of the earlier system described but is free from the disadvantages thereof.

Still another object of this invention is to provide an adsorber which constitutes an improvement over the art both with respect to the efficiency of its operation and with respect to its long-term useful life and structural stability.

It is still another object of my invention to provide an adsorber for the purposes described whose inner vessel can be subjected to thermal loading for long periods but which, even with high pressure gases, need not sustain any significant pressure differential across its walls.

A further object of the invention is to provide a high-pressure adsorber which minimizes the danger of distortion of the inner vessel resulting from the internal pressure.

SUMMARY OF THE INVENTION

These objects and others which will become apparent are attained in accordance with the present invention in an adsorber which comprises a thick-wall pressure-sustaining vessel, a thin-wall inner vessel received with clearance in the outer vessel, a body or filling of gas-permeable adsorption agent within the inner vessel, and inlet and outlet fittings connected to the outer vessel for passing a gas through this body, with the inner vessel being bottomless and means being provided to enable the upper portion at least of the inner vessel to move relative to the outer vessel.

Thus the two key features of the invention thus far described are:

(a) the inner vessel is bottomless and only laterally confines the body of adsorbent which itself can rest upon a grate fixed in the outer vessel, the upper surface of the grate lying flush with the bottom edge of the inner housing or there-against; and (b) at least the upper portion of the inner vessel is moveable relative to the outer vessel, e.g. the duct or fitting at this upper portion of the inner vessel being movably connected (preferably by a bellows connection), with the upper portion of the outer vessel.

Thus pressure equilibrium between the interior and exterior of the inner vessel is assured at all times although only the inner vessel and the body of adsorbent need be heated for regeneration purposes. In addition, the inner vessel is freely moveable in the longitudinal direction under thermal expansion and contraction effects so that there are no strains on any joint.

The relative mobility in the region of the fitting (duct inlet or outlet) connected to the upper portion of the inner vessel and the outer vessel can be obtained by any means affording axial displacement, such means preferably being a fold-type bellows although it is possible to use a bell of telescopically interconnected tubes.

While it has been found to suffice to provide the yielding connection in the form of a displaceable duct in the case in which the inner vessel is vertically elongated and is disposed coaxially with the outer vessel and the latter is vertically elongated, where the inner vessel and/or outer vessel are relatively wide, it is advantageous to provide a flexible connection between the upper portion of the inner vessel and the outer vessel apart from this duct. In this case, the connection can surround the duct or fitting.

It has been found to be advantageous, especially where a fold bellows is provided of thermally sensitive material, to dispose a protective inner tube within the flexible connection and thereby prevent direct contact of the hot gases with the walls of the bellows. The protective tube should be traversed by the hot regenerating gas although the tube can be used for both the gas to be cleaned and the regenerating gas.

According to another feature of the invention the inner vessel is a bottomless container substantially of the configuration of a bell with a downwardly turned mouth. This construction has several significant advantages over conventional constructions in addition to simplicity. Since the bottom of the "bell" is always open, there is no need to provide or maintain a special fitting at the lower end nor is there any possibility that the inner vessel will be subjected to significant internal pressure.

The inner vessel can be provided with an outer layer of thermal insulation.

This layer of thermal insulation limits or prevents the transmission of heat, during the regeneration of the adsorber, from the hot regenerating gas to the outer vessel. This is ensured as long as the bottomless inner vessel reaches, with its lower edge, substantially to the surface upon which the adsorber filling rests. It is, however, important in this case that the heated regenerating gas, which as a rule is passed in counterflow to the gas to be cleaned, enter the adsorbent from above and flow out of the adsorber below. In the opposite case, there is a possible danger that the hot regenerating gas can pass between the inner and outer vessels and give rise to heat loss.

Furthermore, the adsorber of the present invention is designed so that no resultant force, as a function of the pressure of the gas with the next vessel, is applied to the latter since pressure equilibration between the interior and exterior of the inner vessel can be effected through the open bottom of this inner vessel.

During the usual adsorption cycle, the high pressure gas to be cleaned is preferably admitted into the outer vessel through a fitting formed in the bottom thereof below the grate upon which the adsorbent filling rests. The gas passes through the grate and through the body of adsorbent within the inner vessel, being discharged through the fitting at the upper end of this inner vessel, the pressure being the same within and outside the inner vessel. In the regenerating phase, the hot regenerating gas, which usually is at a substantially lower pressure than the gas to be cleaned, is admitted through the upper fitting into the inner vessel and passes through the body of adsorbent and then through the grate, being discharged from the space below the grate within the outer vessel and through the lower fitting thereof. Since in either case the space below the "bell" and surrounding the bell is at substantially the same pressure as the space within the bell, no resultant pressure stress is applied to the inner vessel.

The absorbent, which is laterally enclosed by the inner vessel, rests upon a perforated grate which can be fixed on the wall of the outer vessel, e.g. by suitable brackets or supports, the grate having openings of a width smaller than the particle size of the adsorbent filling. Consequently, the absorbent cannot pass through the openings of the grate and the grate functions, at least in part, as a gas distributor for uniformly distributing the gas to be cleaned over the entire cross section of the inner vessel and hence the body of adsorbent therein.

According to another feature of the invention, the bell-shaped inner vessel simply rests upon the grate while laterally confining the body of adsorbent. This construction has been found to permit especially free mobility of the bell or portions thereof in response to thermal contraction and expansion since the inner vessel or portions thereof can move not only axially or longitudinally (vertically) but also laterally, i.e. can expand radially or circumferentially. This has been found to be especially important where the regenerating temperature is significantly higher than the adsorption temperature.

It has been found to be advantageous in the best mode currently known to me for carrying out the invention in practice to form the inner vessel of a special material, such as Invar steel, having a low coefficient of thermal expansion. This ensures that dimensional changes as a result of temperature variations will be held to a minimum and thereby minimizes the disruption of the body of adsorbent. Minimal dimensional changes permit the means enabling movement of the upper portion of the inner vessel relative to the upper portion of the outer vessel, i.e. the duct or other means connecting the two, to be of smaller dimensions and hence the cost of the system to be reduced. Such means may be referred to hereinafter also as a compensator since it permits relative compensating movement of the inner and outer vessels in the manner described.

For an effective heat balance and high thermal efficiency, it is important that the inner vessel walls be held as thin as possible so that the entire inner vessel will have the smallest possible heat capacity consistent with structural requirements. Where the inner vessel is likely to yield laterally it has been found to be advantageous to provide it with corrugations for vessel expansion and contraction and, in addition, with reinforcing rings to stiffen this thin wall structure.

Of course, this reinforced thin wall structure should have a lower heat capacity than the thicker wall structure which would be necessary in the absence of the stiffening rings.

The principle of the present invention, wherein the inner vessel is connected in a gas-tight but movable manner with the outer vessel at the upper portions of the inner and outer vessels, is applicable to adsorbers of all types. For example, it has already been described in conjunction with upright adsorbers. However, it is also applicable to so-called horizontal adsorbers, i.e. adsorbers in which the outer vessel is horizontally elongated. The principle can be applied to such adsorber constructions in which a single pressure-sustaining outer vessel receives a plurality of separate and spaced apart inner vessels. While the latter system uses a relatively large outer vessel, it is frequently more economical than an arrangement of the same overall size and capacity using a single larger inner vessel.

When a layer of thermal insulation is provided along the exterior of the inner vessel, this layer can extend over the entire outer surface of the inner vessel and can be applied to the or each inner vessel in the form of a helically wound insulation mat having a thickness of about 25 mm and preferably composed of mineral wool, fiber glass or slag wool or fiber.

When the adsorber described is operated without an excessive temperature differential between the regeneration and adsorption phases, the additional insulation upon the inner vessel can be eliminated entirely since the gas filling the space between the two vessels tends to form a sufficient heat shield. This is especially the case when the regenerating phase of the cycle is proportionately short, e.g. as in a process in which the adsorbent is only partly regenerated, say at the discharge side for the cleaned gas.

According to another aspect of the invention, it is advantageous to provide, upstream and downstream of the adsorbent, gas-distributing sieves which can be constituted from perforated plates or wire mesh to improve the spread of the gases over the total cross section of the body of adsorbent. This gas-distribution means can be supplemented with gas-diverting baffles in the path of the gas directly ahead of the inlet and outlet fittings or ducts and generally perpendicular to the axes thereof. Inclined baffles may be laterally offset from the transverse baffles to eliminate dead spots.

The dimensions and wall thickness of the vessels and the quantity and bed height of the adsorbent and like structural details of the adsorbent will, naturally, depend upon many parameters, for example, the temperatures for adsorption and desorption, the gas pressure, the gas throughput, the quantity of impurities which must be picked up by the adsorber or the degree of cleaning desired, and the duration of the adsorption and desorption phases of the operating cycle.

However, for an adsorber having a diameter of 1 to 4 meters, as in the best mode embodiment of the invention illustrated in the drawing and described below, the wall thickness of the outer vessel should be 6 to 12 mm and that of the inner vessel 2 to 3 mm. The diameters of the transverse gas-deflecting baffles, or their longitudinal dimensions where they are rectangular, should be generally between 1.2 and 2 times the inner diameter of the respective inlet duct, preferably between 1.4 to 1.6 times the inlet diameter. The spacing of the baffle from the inlet duct should be generally between 0.8 to 1.8 times (preferably between 1.3 to 1.5 times) this inner diameter. Where the baffle is domed, the latter distance is the dimension measured from the portion of the baffle most removed from the duct.

When horizontally elongated adsorbers are used, the outer vessel can have a length of up to 12 meters and the inner vessels can have diameters of 3 to 5 meters, the wall thickness of the outer vessel being about 12 mm and that of the inner vessel being about 2 mm.

BRIEF DESCRIPTION OF THE DRAWING

The above and other objects, features and advantages of the present invention will become more readily apparent from the following description, reference being made to the accompanying drawing in which:

FIG. 3 is another similar view of a horizontal adsorber provided with a plurality of inner vessels.

SPECIFIC DESCRIPTION

Figure 1:
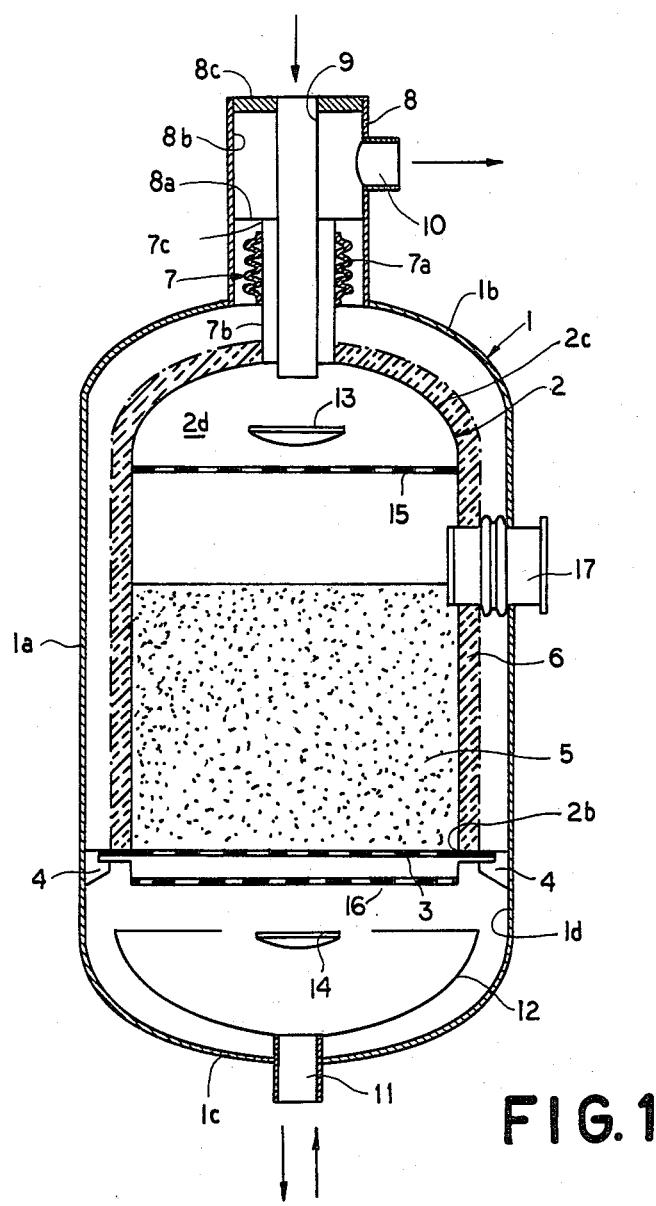
FIG. 1 is an axial cross-sectional view, partly in diagrammatic form, through an upright (vertically elongated) adsorber having a single inner vessel according to the invention.

In the drawing, corresponding parts of the three embodiments have been designated by the same reference characters or reference characters in a 100, 200 .. . series. The adsorber can comprise a pressure-retentive and relatively thick-wall outer vessel 1 having a cylindrical body 1a and upwardly and downwardly domed ends 1b and 1c. The vessel 1 receives with all-around clearance a thin-wall inner vessel 2 which is open at its bottom 2b and is provided with an upwardly domed portion 2c at its upper end, the inner vessel 2 having the configuration of a downwardly open bell (FIG. 1).

The inner vessel 2 rests freely upon a support grate 3 which, in turn, is carried by a plurality of angularly equispaced inwardly projecting supports 4 formed on the inner surface 1d of the outer vessel 1.

The grate 3 is provided with perforations 3a (e.g. in the form of slots between grate bars 3b) and supports directly the filling of the adsorbent 5, e.g. activated carbon.

In the embodiment illustrated, the outer surface of the inner vessel 2 is provided with a layer of fibrous insulation mats of the composition described.

The adsorber also comprises a folded-type bellows 7a which movably connects the two portions of a duct 7b, 7c together, the assembly 7a–7c together forming a first inlet or outlet duct or fitting generally represented at 7. The fitting 7b is rigid with the top or dome 2c of the inner vessel 2 while the fitting or duct 7c is rigid with a plate 8a defining a compartment 8b in an outer pipe 8 provided with a lateral duct 10 through which the claimed gas is led from the system. The pipe 8 is closed by a cover 8c in which an inner pipe 9 is welded and received so that this inner pipe, which is connected to a source of heated regenerating gas, forms a heat shield for the surrounding assembly 7 and hence the bellows 7a. The pipe 9 also opens into the space 2d within the inner vessel 2 above the body of the adsorbent.

At its lower end, the outer vessel 1 is provided with a rigid gas outlet and inlet fitting or duct which is provided with an upwardly concave heat shield 12. Positioned within the adsorber, e.g. by spiders or supports not shown, are gas-deflecting baffle plates 13 and 14 which are spaced ahead of the fittings 7 and 9 on the one hand and the fitting 11 on the other.

For still further uniformity in the distribution of the gas, gas distribution ducts 15 and 16 in the form of perforated sieves are provided above and below the body of adsorber 6.

In operation, during the adsorption phase, the gas to be cleaned is admitted under pressure by the duct 11 and is distributed uniformly over the cross section of the grate 3, the body 5 and the inner vessel 2. Adsorbable impurities, e.g. sulfur dioxide, can be removed from the waste gas which can be an exhaust from an industrial process. The impurities remain in the body of adsorbent 5 and the clean gas passes out of the system via the conduit 7 and the pipe 10.

When the adsorbent is charged to the desired degree with impurities, the flow of the gas to be cleaned is cut off, the pressure in the adsorber is lowered through the fitting 10 to the regenerating pressure and at this reduced pressure, hot regenerating gas is admitted through the duct 9. The hot regenerating gas is distributed uniformly over the cross section of the body 15 of the adsorbent by the baffle 13 and the sieve 15. The regenerating gas traverses the filling 5 of the adsorbent and raises its temperature to effect removal of the impurities which are carried away by entrainment with the regenerating gas through the second fitting 11. Naturally, the adsorber is provided with the usual valves for alternating the flow of gases through the body 5. The adsorbent is then permitted to cool and an adsorption cycle commences.

Figure 2:
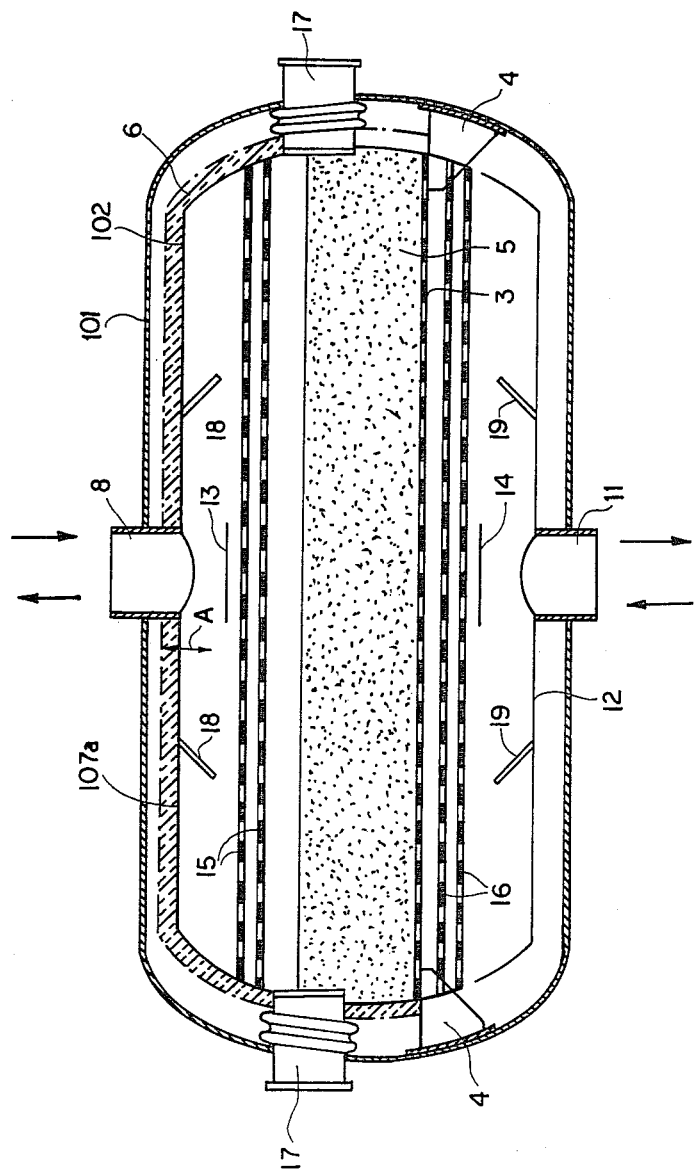
FIG. 2 is a view similar to FIG. 1 showing a horizontal adsorber with a single inner vessel.

FIG. 2 illustrates an embodiment of the invention in which the housing 101 or outer vessel of the adsorber is horizontally elongated and the compensating means is formed by the flat thin upper wall 107a of the inner vessel 102, the wall 107a being flexible in the direction of arrow A. In this embodiment as well, the inner vessel rests upon the sieve 3 which is supported at 4 and laterally contains the body 5 of adsorbent. In this embodiment, two manholes 17 afford access to the adsorber for repair and replacement of the adsorber, the embodiment of FIG. 1 using a single manhole 17. The uniform gas distribution is here ensured by doubling the sieves 15 and 16 and providing additional baffles 18 and 19 which are inclined and deflect the gas toward the respective sieves.

Naturally, compensating bellows as used in the embodiment of FIG. 1 or that of FIG. 3 may be provided if the deflection of member 107a is insufficient.

The embodiment of FIG. 3 provides a pressure-retentive outer vessel 201 having a plurality of thin-wall inner vessels 2 resting upon a common grate 203 supported at 4 on the outer vessel. Each of the inner vessels is here provided with a respective fitting 7 as previously described as well as a fitting 11 axially aligned with the fitting 7. The thermal insulation for the inner vessel has been omitted from the illustration of FIG. 3 but will normally be present. The manholes affording access to the inner vessels in this embodiment have also been omtted for clarity of illustration. Naturally, the embodiment of FIGS. 2 and 3 operate in the manner described for FIG. 1.

As can be seen from FIG. 1, the baffles 13 and 14 can be concave in the direction of regenerating gas flow through inlet 9 or convex toward the oncoming clean gas flow as desired. In any event, the baffles 13 and 14 lie generally perpendicular to the direction of gas flow.

Figure 4:
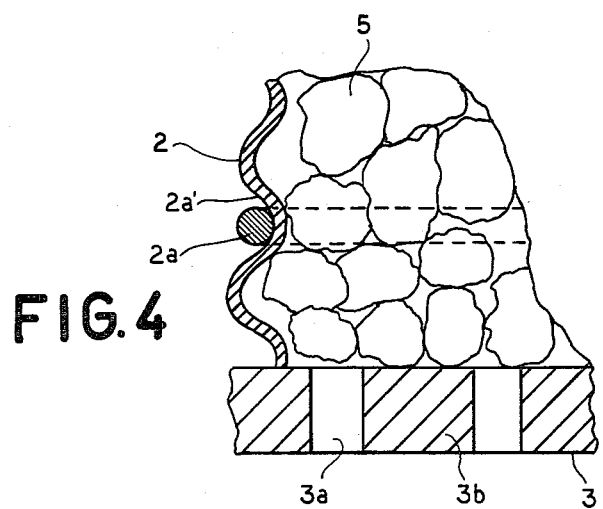
FIG. 4 is a detail view of a portion of one of the adsorbers illustrating a feature of the invention.

In FIG. 4 the inner vessel 2 is shown to be corrugated and, therefore, to have corrugations 2a' which can receive stiffening rings 2a. The manholes can be provided with bellows between the inner and outer vessels, as shown, to accommodate expansion, contraction and other movements of the inner vessel.

I claim:
1. An adsorber for cleaning of gases comprising:
a pressure retentive thick-wall outer vessel provided with a duct at a bottom portion of said outer vessel;
a rigid grate spanning the interior of said outer vessel and rigidly secured thereto;
a loose gas-permeable body of an adsorbent resting on said grate;
a closed-top downwardly open inner vessel of lesser wall thickness than said outer vessel and disposed in said outer vessel and having a unitary therewith a lower edge resting freely upon said grate without attachment thereto, said inner vessel being bottomless and fully open downwardly at said edge while confining said gas-permeable body of said adsorbent resting on said grate, a free space completely surrounding said inner vessel within said outer vessel to permit lateral movement of said inner vessel relative to said grate and said outer vessel; and
yieldable means including a further duct connecting said upper portion of said inner vessel to an upper portion of said outer vessel for permitting gas flow out of and into said inner vessel.

2. The adsorber defined in claim 1 wherein the breadth dimensions of the outer and inner vessels are greater than their heights.

3. The adsorber defined in claim 1 wherein the breadth dimension of the outer vessel is greater than its height and a plurality of such inner vessels are provided within said outer vessel, each inner vessel being formed with the respective further ducts.

4. The adsorbent defined in claim 1, further comprising a layer of thermal insulation between said inner and outer vessels said layer being thinner than the space between said inner and outer vessels.

* * * * *